Sept. 20, 1955 J. S. BAYLEY 2,718,198
DEVICE FOR APPLYING FOODS OF PASTY CONSISTENCY
TO SLICES OF BREAD OR CRACKERS, OR THE LIKE
Filed Feb. 23, 1954 2 Sheets-Sheet 1
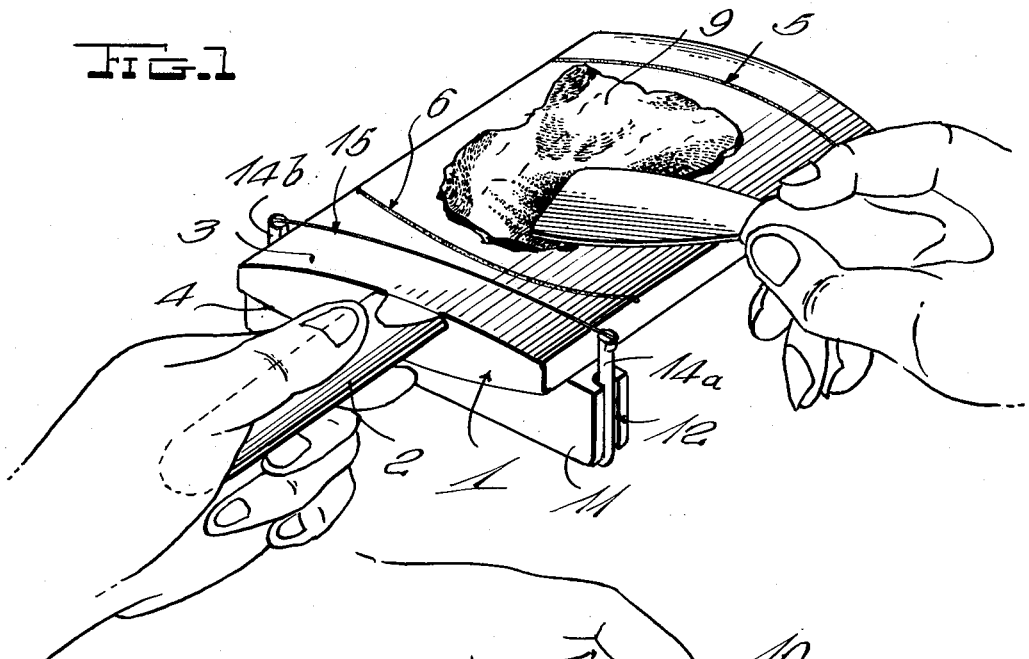
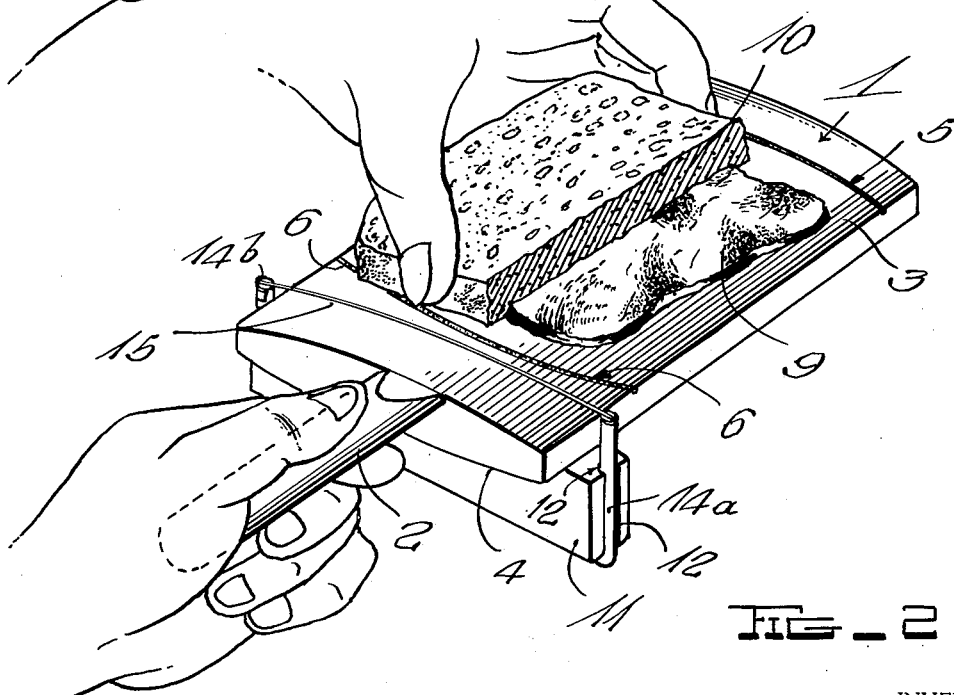
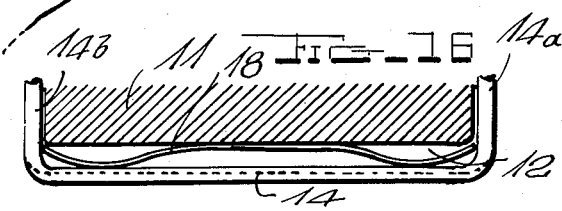
INVENTOR
John S. Bayley,
BY
John B. Brady
ATTORNEY

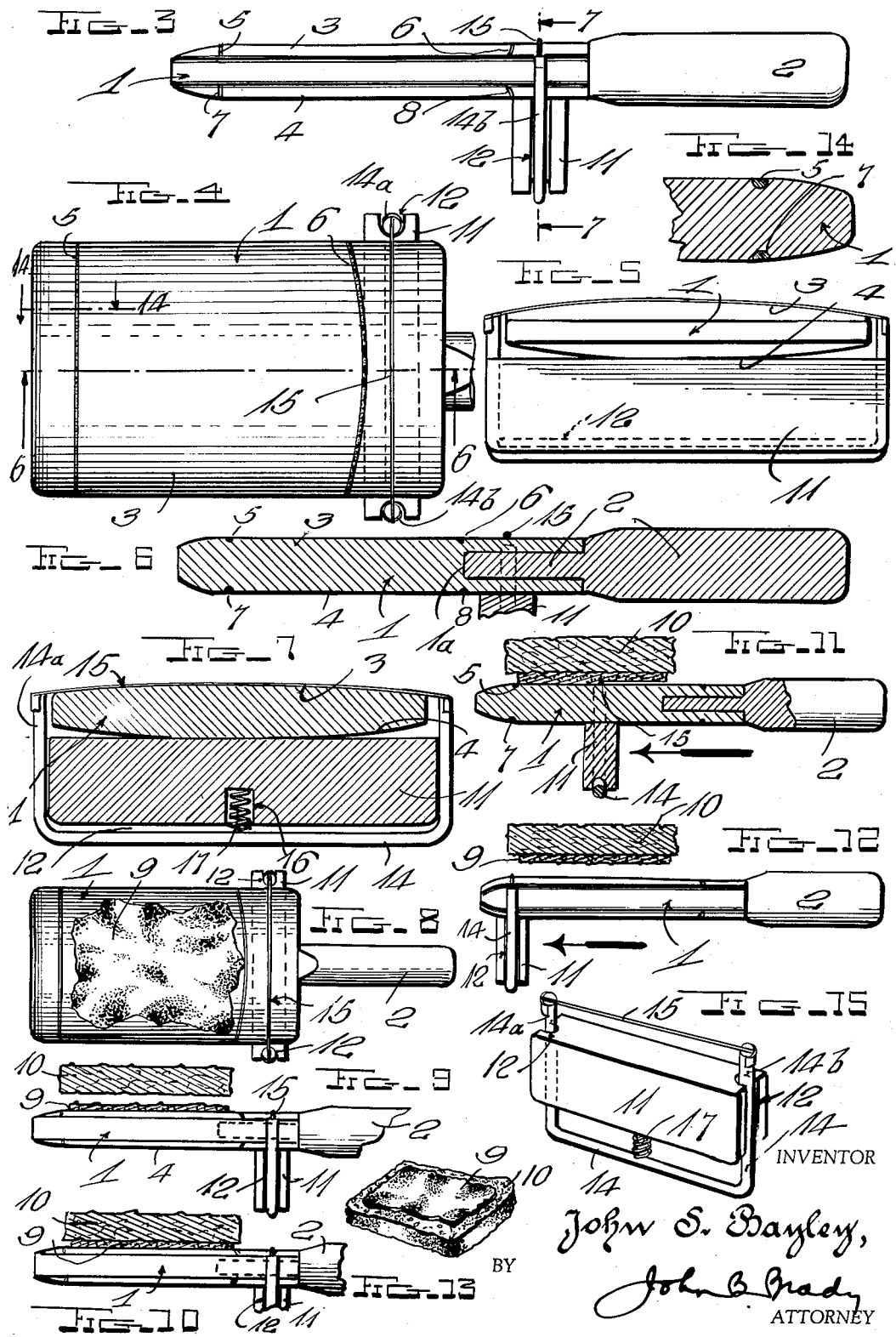

United States Patent Office 2,718,198
Patented Sept. 20, 1955

2,718,198

DEVICE FOR APPLYING FOODS OF PASTY CONSISTENCY TO SLICES OF BREAD OR CRACKERS, OR THE LIKE

John S. Bayley, Cockeysville, Md.

Application February 23, 1954, Serial No. 411,736

10 Claims. (Cl. 107—1)

My invention relates broadly to a kitchen and table accessory and more particularly to a device for applying foods of pasty consistency to slices of bread, crackers and the like.

One of the objects of my invention is to provide a device for facilitating the spreading of butter, oleo, cheese, peanut-butter, and other foods of pasty consistency on slices of bread, crackers and the like, in a manner which avoids the tearing of the bread or the breaking of the crackers, and the like.

Another object of my invention is to provide a construction of pallet which may be readily supported through a handle at one end and used as a surface on which food of pasty consistency may be spread and against which the surface of a slice of bread or cracker may be pressed for adhesively uniting the surface of the bread or cracker with the food and wherein a severing wire slide may be moved linearly over the surface of the pallet for cutting the food from the surface of the pallet, enabling the bread or cracker, or the like, to be removed from the pallet with the food adhesively bonded thereto without injury to the texture of the bread or cracker, or the like.

Still another object of my invention is to provide a construction of pallet and supporting handle where the pallet is symmetrically formed to enable either side thereof to be used alternately for receiving the food of pasty consistency which is adhesively applied to the surface of a slice of bread or a cracker and the food severed from the pallet without injury to the texture of the bread or cracker, or the like.

Still another object of my invention is to provide a construction of device for applying foods of pasty consistency to slices of bread and the like wherein a pallet is marked with limiting lines defining the area within which the food may be spread thereon and over which a slice of bread or cracker, or the like, may be pressed to insure adhesion of the food thereto, preparatory to a slicing action which does not injure or tear the texture of the bread or cracker.

Other and further objects of my invention reside in the construction and arrangement of a linear slide operative in association with a food-receiving pallet for cutting the food from the pallet after the adhesive bonding thereof to the surface of a slice of bread, a cracker, or the like, as set forth more clearly in the specification hereinafter following by reference to the accompanying drawings, in which:

Fig. 1 is a perspective view showing the manner of spreading the food of pasty consistency over the surface of the pallet;

Fig. 2 illustrates the manner of pressing a slice of bread or cracker, or the like, over the spread layer of food preparatory to a linear sliding action of the severing device for cutting the bond between the pallet and the food and effecting removal of the bread or cracker with the food attached thereto;

Fig. 3 is a side elevational view of the device of my invention showing the severing slide moved out of position on the pallet preparatory to the coating of the pallet with the pasty food;

Fig. 4 is a top plan view of the device illustrated in Fig. 3;

Fig. 5 is an end view of the device of my invention;

Fig. 6 is a longitudinal sectional view wherein the slide is partially broken away and where the severing wire is magnified in cross section for the purpose of clarifying the invention;

Fig. 7 is a vertical transverse sectional view taken on line 7—7 of Fig. 3;

Fig. 8 is a top plan view showing the coating of food applied over the pallet;

Fig. 9 is a side elevational view showing a slice of bread about to be applied or pressed into bonding relation with the food of pasty consistency spread over the surface of the pallet;

Fig. 10 illustrates the condition where the slice of bread is pressed into adhesive bonding relationship with the layer of food on the surface of the pallet;

Fig. 11 is a vertical sectional view showing the slide being moved linearly along the pallet for cutting the food from the surface of the pallet without disturbance to the texture of the slice of bread, or cracker, or the like;

Fig. 12 illustrates the slice of bread, with the food adhesively bonded thereto, being wholly lifted from the surface of the pallet, after completion of the severing operation;

Fig. 13 is a perspective view of the bread with the food layer adhesively bonded thereto after removal from the pallet;

Fig. 14 is an enlarged fragmentary end sectional view illustrating the marking means employed in the pallet structure for indicating the limits within which the coating of food is to be spread;

Fig. 15 is a perspective view illustrating one form of linear slide for cutting the food from the surface of the pallet; and Fig. 16 shows a modified form of slide by which uniform pressure is secured between the slide and the pallet throughout the transverse width of the pallet.

My invention contemplates a method for spreading foods of pasty consistency over the surface of slices of bread or crackers, and the like, whereby the fibers or texture of the bread or crackers remains intact, inasmuch as it is not necessary to apply a blade against the surface of the bread or cracker as conventionally required.

I have developed the device of my invention for spreading butter, oleo, cheese, peanut-butter, or other firm refrigerated spreads or foods of pasty consistency over the surface of soft bread or crackers. Frequently when such spreads are applied over the surface of bread or crackers the texture of the bread is torn or the crackers are broken. By use of the device of my invention the food is not spread upon the bread or crackers for thereby subjecting the texture of the bread or crackers to stress resulting in the tearing or crumbling of the bread or crackers.

In lieu of this I provide a pallet having a pair of symmetrical surfaces marked to indicate the effective area over which the food of pasty consistency may be spread. When a layer of such food is deposited over the surface of the pallet a slice of bread, or a cracker, is pressed thereagainst for adhesively bonding the surface of the bread or cracker to the food. Then a severing device, consisting of a transverse cutting wire, is moved linearly of the pallet for cutting the food from the surface of the pallet, enabling the bread or cracker, and the like, to be removed with the food adhering thereto. The device of my invention has proven highly effective in the making of sandwiches expeditiously where the original texture of the bread or cracker is preserved.

Referring to the drawings in more detail, reference character 1 designates the pallet of the device of my invention which is supported by means of handle 2 for presenting a pair of opposite symmetrical surfaces 3 and 4 which are slightly convex. Surface 3 contains markings 5 and 6 embedded therein for indicating the limits within which the food of pasty consistency may be spread. The surface 4 contains markings 7 and 8 which also define the limits within which the food may be spread over the surface 4 of the pallet.

In Figs. 1–2, and Figs. 8–12, the food of pasty consistency is represented at 9 which is spread by an appropriate blade as represented more particularly in Fig. 1 over the surface 3 of the pallet 1. In Fig. 2 I have shown the manner in which the slice of bread, or cracker, or the like, indicated at 10, is pressed into intimate bonding relationship to the layer of pasty food 9.

The pallet 1 is provided with a linearly slidable handgrip device shown at 11 which depends beneath the pallet 1, and is provided with a linear groove 12 extending around three sides thereof. A yoke 14 fits within this groove and has upwardly directed projections 14a and 14b which extend on opposite sides of the pallet 1. A severing wire 15 is stretched taut between the upwardly extending ends of projections 14a and 14b. The severing wire 15 moves linearly over the convex surface of the pallet 1 in intimate relation thereto for performing a cutting operation for severing the pasty food from the surface of the pallet. The handgrip 11 is provided with a vertically extending recess 16 centrally thereof into which expansion coil spring 17 fits for exerting a continuous yielding force against yoke 14 for thereby maintaining severing wire 15 in intimate relation to the surface of the pallet 1.

In lieu of the single spring 17 I may provide an arrangement of flat leaf spring 18 as shown in Fig. 16 where the leaf spring 18 is substantially sinusoidal in contour and fits within linear groove 12 in handgrip 11 for uniformly maintaining the severing wire 15 in intimate contact with the surface of pallet 1 as the handgrip is moved linearly of the pallet.

In the operation of the device of my invention the food of pasty consistency is spread over the surface of the pallet as represented in Figs. 1 and 8. The slice of bread, or a cracker or the like, represented at 10, in Fig. 9, is then pressed over the layer of food 9 so that an adhesive bond is established therewith as indicated in Fig. 10. Handgrip 11 is then moved linearly from its remote position shown in Figs. 1, 4, 6 and 8–10 intermediate the limit line 6 and the handle 2 progressively along the pallet 1, as represented in Fig. 11, for thereby completely severing the adhesive bond between the food and the surface of the pallet 1 as represented in Fig. 12. As thus severed the final product appears as in Fig. 13 where the layer of food of pasty consistency 9 extends over the surface of the slice of bread 10 without having disturbed the texture of the bread, or the cracker or the like.

While I have described my invention in certain of its embodiments I realize that certain modifications may be made and I desire that it be understood that no limitations upon my invention are intended other than may be imposed by the scope of the appended claims.

What I claim as new and desire to secure by Letters Patent of the United States is as follows:

1. A device for spreading food of pasty consistency on slices of bread and the like which comprises a pallet having a supporting handle on one end for maintaining the position of the pallet while the pallet is receiving a coating of food of pasty consistency and for supporting a slice of bread and the like in adhesive relation to the coating of food above the pallet, a severing slide mounted on said pallet consisting of a handle device disposed beneath the pallet, projections extending from said handle device to positions on opposite sides of said pallet and a severing wire extending between said projections and movable over the surface of said pallet for severing the coating of food from the surface of said pallet while the coating of food remains adhesively connected with the slice of bread supported above said pallet.

2. A device for spreading food of pasty consistency on slices of bread and the like as set forth in claim 1, in which said severing slide includes spring means for urging said severing wire continuously into contact with the surface of said pallet as the severing slide is moved linearly along the pallet.

3. A device for spreading food of pasty consistency on slices of bread and the like as set forth in claim 1 in which opposite lineal end portions of said severing wire extend beyond the opposite lateral edge portions of said surface.

4. A device for spreading food of pasty consistency on slices of bread and the like as set forth in claim 1 in which the projections extending from said handle device form part of a yoke that fits laterally around said handle device and wherein said handle device is centrally recessed in alignment with said yoke and an expansion coil spring confined in said recess and bearing against said yoke for yieldingly maintaining said severing wire in surface contact with the food receiving surface of said pallet.

5. A device for spreading food of pasty consistency on slices of bread and the like as set forth in claim 1 in which said handle device includes a hand-grip that projects beneath the surface of said pallet for a distance substantially greater than the thickness of said pallet for facilitating the grasping of said hand-grip for linearly moving said severing wire over the upper surface of said pallet while said hand-grip is correspondingly moved over the lower surface of said pallet.

6. A device for spreading food of pasty consistency on slices of bread and the like as set forth in claim 1 in which said pallet is reversible in position and has a surface for receiving a pasty food consistency on either surface thereof which is maintained in an upper position.

7. A device for spreading food of pasty consistency on slices of bread and the like as set forth in claim 1 in which said pallet has both an upper and lower surface both of which are slightly convex and both of which are reversibly usable to support the pasty food distributed thereover.

8. A device for spreading food of pasty consistency on slices of bread and the like as set forth in claim 1 in which said pallet has indicia markings thereon indicating the limits within which the food of pasty consistency may be spread for application to the slice of bread and the like thereto when effecting an adhesive connection with the food.

9. A device for spreading food of pasty consistency on slices of bread and the like as set forth in claim 1, a flat ribbon-like sinuous spring interposed between the surface of said handle device that contacts the undersurface of said pallet for maintaining said severing wire in contact with the upper food receiving-surface of said pallet substantially uniformly across the lateral width of said pallet.

10. A device for spreading food of pasty consistency on slices of bread and the like as set forth in claim 1, in which said handle device consists of a four sided block having one side thereof smooth for establishing sliding contact with the undersurface of said pallet and three sides thereof linearly grooved and wherein said projections constitute the ends of a yoke that fits within the linear grooves in said handle device and means disposed between said yoke and said handle device for yieldably maintaining said severing wire in contact with the upper surface of said pallet throughout the displaceable positions thereof along said pallet.

References Cited in the file of this patent

UNITED STATES PATENTS

| | | |
|---|---|---|
| 1,260,822 | Singleton | Mar. 26, 1918 |
| 1,387,613 | Proper | Aug. 16, 1921 |
| 2,085,372 | Lenk | June 29, 1937 |
| 2,168,389 | Bemis | Aug. 8, 1939 |